Aug. 23, 1927.
A. M. BRENNE
1,640,066
FRICTION SHOCK ABSORBING MECHANISM
Filed Sept. 17, 1925
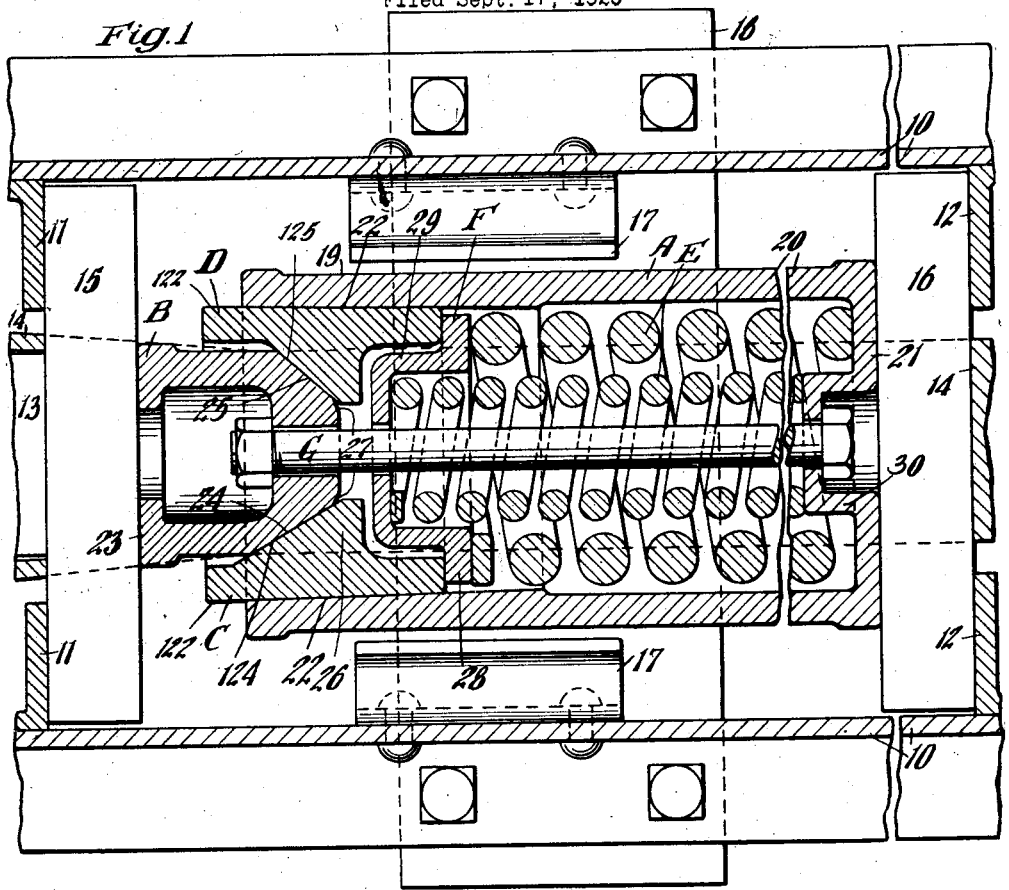
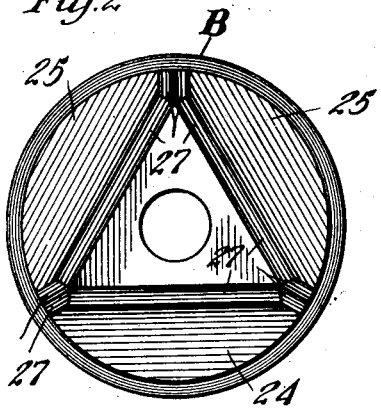
Witness
Wm. Geiger
Inventor
Arild M. Brenne
By George J. Haight
His Attorney Patented Aug. 23, 1927.

1,640,066

UNITED STATES PATENT OFFICE.

ARILD M. BRENNE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed September 17, 1925. Serial No. 56,933.

This invention relates to improvements in friction shock absorbing mechanisms.

One object of the invention is to provide a friction shock absorbing mechanism, especially designed for railway draft riggings, including a plurality of friction elements and wedge elements having wedge faces cooperating with wedge faces on certain of the friction elements, wherein the co-acting wedge faces are so designed that gouging thereof will be prevented.

More specifically, an object of the invention is to provide a mechanism of the character indicated, including a main wedge and friction shoes having sets of co-operating wedge faces, wherein one of the faces of each set is at all times overlapped by the co-operating face and the member carrying the overlapped face is made of softer material than the co-operating member, whereby damage to the faces by gouging is effectively prevented.

Other objects and advantages of the invention will more fully and clearly appear from the description and claims hereinafter following.

In the drawings forming a part of the specification, Figure 1 is a longitudinal, sectional view of a portion of a railway draft rigging, the section through the shell and friction elements therewithin corresponding to two section planes at approximately 120° apart. And Figure 2 is a rear end, elevational view of a wedge block used in connection with my improved mechanism.

In said drawings, 10—10 indicate the usual draft or center sills of a railway car underframe, to the inner faces of which are secured front stop lugs 11—11 and rear stop lugs 12—12. The inner end portion of the drawbar is designated by 13 to which is operatively connected a hooded cast yoke 14 of well known form. Front and rear followers 15 and 16 and the shock absorbing mechanism proper, hereinafter more fully described, are disposed within the yoke. The friction shock absorbing mechanism proper, illustrated in the drawing, is of that form employing a substantially cylindrical friction shell and spring cage, and in order to maintain the combined cage and shell in central position, the draft sills have guide plates 17—17 secured to the inner sides thereof. The yoke and the parts therewithin are operatively supported by a detachable saddle plate 18 fixed to the draft sills.

The improved shock absorbing mechanism proper, as shown, comprises broadly a combined friction shell and spring cage A; a wedge block B; three friction wedge shoes C, D and D, only one of the shoes D being shown in the drawing; a main spring resistance E; a spring follower F; and a retainer bolt A.

The combined friction shell and spring cage is in the form of a substantially cylindrical casting having the friction shell proper 19 formed at the forward end thereof and the spring cage 20 at the rear end. The casting has an integral, transverse, rear end wall 21 adapted to bear on the rear follower 16. The interior of the friction shell 19 is preferably composed of three true cylindrical friction surfaces 22—22, symmetrically arranged around the axis, and each surface is of approximately 120° in extent. The cylindrical surfaces 22 are converged inwardly of the shell on a relatively slight taper and in such a manner that the inner ends thereof form a true circle.

The wedge B is in the form of a hollow casting having a front, transverse, flat face 23 adapted to bear upon the front follower 15. At its inner end, the wedge block B is provided with three wedge faces 24, 25 and 25. The wedge face 24 is disposed at a relatively keen angle to the longitudinal axis of the mechanism, while the faces 25 are disposed at relatively blunt angles to said axis. As clearly shown in Figures 1 and 2, the wedge block is in the form of an irregular pyramid, the wedge faces converging inwardly of the mechanism.

Three friction shoes C, D and D are of similar design, except as hereinafter pointed out. Each friction shoe has an outer longitudinally disposed, true cylindrical friction surface 122 adapted to co-operate with the corresponding friction surface 22 of the friction shell. On the inner side, each shoe is provided with a lateral enlargement 26 having a wedge face on the front side thereof, the wedge face on the shoe C being indicated by 124, the same being disposed at a relatively keen angle to the axis of the mechanism and co-operating with the keen wedge face 24 of the wedge B. The wedge faces of the two shoes D are indicated by 125 and are correspondingly inclined to the two faces 25 of the wedge block B and co-operate therewith. The shoes C, D and D have the inner ends thereof bearing directly on the spring follower E in the normal position of the parts. As most clearly shown in Figure 2, the wedge faces 24, 25 and 25 of the wedge block B which cooperate respectively with the faces 124, 125 and 125, are of such dimensions that they are normally overlapped by the latter. The edges of all of the faces of the wedge block are cut away or beveled as indicated at 27—27 so as to avoid sharp angles at the edges of the wedge faces which would present sharp edges causing damage to the co-operating wedge faces of the shoes. The wedge block B is preferably formed of malleable iron, while the shoes are preferably made of steel, whereby the principal wear will occur on the wedge faces of the wedge block B. As the wedge faces of the shoes at all times overlap the wedge faces of the block, the relatively softer faces of the latter will not be marred or gouged by the edges of the shoe wedge faces during the operation of the gear.

The spring follower F is in the form of a cup-shaped cap having a relatively heavy annular flange 28 bearing on the inner ends of the friction shoes and a cupped projection 29 receiving the front end of the inner coil of the main spring resistance E, the inner wall of the cupped portion forming a bearing for the corresponding end of this spring.

The spring resistance E comprises an outer relatively heavy coil and an inner light coil, the outer coil having its rear end bearing on the end wall 21 of the combined friction shell and spring cage casting and the inner coil having the rear end thereof bearing on a hollow boss 30 projecting inwardly from the wall 21.

The mechanism is held to uniform overall length and in assembled relation by the retainer bolt G, which has its forward end suitably anchored to the wedge B and the rear end thereof anchored within the hollow boss 30 of the casting A. In addition to maintaining the part assembled, the retainer bolt G holds the springs under initial compression, and may be used to adjust the parts to the proper length. Compensation for wear is had by expansion of the spring resistance elements E which are under initial compression as hereinbefore pointed out.

The operation of the improved mechanism, assuming a buffing or compression stroke applied to the draft rigging, is as follows: The wedge B is forced inwardly with reference to the shell A, setting up a wedging action between the keen wedge faces of the wedge B and the corresponding face of the friction shoe D. During this action, there will be substantially no wedging action between the blunt faces of the wedge and the shoes C. As the compression continues, the shoes will be carried inwardly of the shell on the friction surface thereof, compressing the main spring resistance E. On account of the relatively non-wedging angle of the co-operating faces of the wedge and the blunt shoes, the blunt shoes will be advanced longitudinally slightly ahead of the keen angled shoe. Due to the taper of the friction shell, the blunt shoes will be forced radially, inwardly during their longitudinal movement, slipping on the blunt faces of the wedge and causing the shoes to be moved still further ahead of the shoe D. The friction shell is capable of a limited amount of radial expansion which takes place during the compression of the mechanism and the forces stored up therein are available during release to contract the wedge system. Upon removal of the actuating or compression force, the contraction of the shell will produce a relative approach toward the center line of the mechanism of all three shoes and this in turn causes the pressure transmitting wedge B to be squeezed out from between the shoes, said action being facilitated by reason of the blunt angle faces 25—25 and 125—125 of the wedge and the blunt shoes respectively. The initial release action thus obtained results in loosening the wedge B sufficiently to permit the spring to become effective to start moving all of the shoes outwardly of the shell. The outward movement referred to continues until movement of the wedge B is limited by the retainer bolt G. The three shoes will then be forced to assume their normal position as shown in Figure 1.

From the preceding description taken in connection with the drawing, it will be evident that I have provided a friction shock absorbing mechanism having a friction wedge system wherein damage to the co-operating wedge faces of the members of the system, due to gouging of the faces of one member by the edges of the faces of the other member co-operating therewith is entirely eliminated by forming one of said members of softer material than the other co-operating member and so designing the parts that the wedge faces of the relatively softer member will present relatively blunt edges and will be at all times overlapped by the wedge faces of the co-operating member.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a column member having longitudinal friction surfaces thereon; of friction elements longitudinally slidable on said member; spring resistance means co-operating with said elements; and a wedge element, said friction elements and wedge element having co-operating sets of wedge faces, one of the faces of each set being so proportioned and arranged as to be overlapped by the other faces of said set and said element carrying the overlapped faces being of softer material than the co-operating element, said faces of the element of softer material having relatively blunt edges.

2. In a friction shock absorbing mechanism, the combination with a friction shell having interior friction surfaces; of a plurality of friction shoes co-operating with the friction surfaces of the shell, each of said shoes having a wedge face, said shoes being of the same material throughout; a main wedge having wedge faces co-operating with said shoe faces, each of said wedge faces being disposed at an obtuse angle to the immediately adjacent surfaces of the wedge, said wedge being of the same material throughout, said material being softer than the material of the shoes, the faces of said wedge being overlapped by the shoe faces during the entire compression stroke of the mechanism; and a spring resistance co-operating with said shoes.

In witness that I claim the foregoing I have hereunto subscribed my name this 14th day of September, 1925.

ARILD M. BRENNE.